(12) United States Patent
Marmilic et al.

(10) Patent No.: US 10,774,740 B2
(45) Date of Patent: Sep. 15, 2020

(54) GAS TURBINE ASSEMBLY AND CORRESPONDING OPERATING METHOD

(71) Applicant: Ansaldo Energia Switzerland AG, Baden (CH)

(72) Inventors: Robert Marmilic, Rieden (CH); Jaan Hellat, Baden-Rütihof (CH); Ewald Freitag, Baden (CH); Adnan Eroglu, Untersiggenthal (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 585 days.

(21) Appl. No.: 14/048,878

(22) Filed: Oct. 8, 2013

(65) Prior Publication Data
US 2014/0033728 A1 Feb. 6, 2014

Related U.S. Application Data

(63) Continuation of application No. PCT/EP2012/056323, filed on Apr. 5, 2012.

(30) Foreign Application Priority Data

Apr. 8, 2011 (CH) .......................... 636/11

(51) Int. Cl.
*F02C 3/00* (2006.01)
*F02C 7/141* (2006.01)
(Continued)

(52) U.S. Cl.
CPC ............... *F02C 3/00* (2013.01); *F02C 7/141* (2013.01); *F02C 7/228* (2013.01); *F23R 3/346* (2013.01);
(Continued)

(58) Field of Classification Search
CPC .. F02C 7/141; F02C 7/228; F02C 3/00; F23R 3/346; F23R 2900/03341; F05D 2220/722;
(Continued)

(56) References Cited

U.S. PATENT DOCUMENTS 4,903,477 A * 2/1990 Butt .................... F23R 3/002
60/39.37
5,497,611 A * 3/1996 Benz .................... F23R 3/02
60/776
(Continued)

FOREIGN PATENT DOCUMENTS

DE 103 12 971 12/2004
EP 0 314 112 5/1989
(Continued)

OTHER PUBLICATIONS

Translation DE 10312971, EPO.*
(Continued)

*Primary Examiner* — Carlos A Rivera
(74) *Attorney, Agent, or Firm* — Buchanan Ingersoll & Rooney PC

(57) ABSTRACT

The invention relates to a gas turbine assembly which substantially includes at least one compressor, at least one first burner, at least one second burner that is connected downstream of the first burner, and at least one turbine that is connected downstream of the second burner. At least the first and second burner form a component of a tubular or quasi-tubular combustion chamber element in the flow direction of the combustion path of the burners. The combustion chamber element being closed or quasi-closed and extending between the compressor and the turbine. The combustion chamber elements are arranged around the rotor of the gas turbine assembly in the shape of a ring.

25 Claims, 4 Drawing Sheets

(51) Int. Cl.
*F02C 7/228* (2006.01)
*F23R 3/34* (2006.01)

(52) U.S. Cl.
CPC .............. *F05D 2220/722* (2013.01); *F23R 2900/03341* (2013.01); *Y02E 20/16* (2013.01); *Y02E 20/18* (2013.01); *Y02T 50/671* (2013.01); *Y02T 50/675* (2013.01)

(58) Field of Classification Search
CPC ....... Y02E 20/18; Y02E 20/16; Y02T 50/675; Y02T 50/671; F01D 9/023
See application file for complete search history.

(56) References Cited

U.S. PATENT DOCUMENTS

| | | | |
|---|---|---|---|
| 5,626,017 A | 5/1997 | Sattelmayer | |
| 5,974,781 A * | 11/1999 | Correa | F23R 3/34 60/39.37 |
| 6,568,187 B1 * | 5/2003 | Jorgensen | F01D 9/023 60/752 |
| 6,868,676 B1 * | 3/2005 | Haynes | F02C 3/14 60/740 |
| 6,978,622 B2 * | 12/2005 | Dittmann | F01D 25/12 60/782 |
| 6,981,358 B2 * | 1/2006 | Bellucci | F23D 11/402 60/39.17 |
| 7,329,084 B2 * | 2/2008 | Dittmann | F01D 25/12 415/1 |
| 8,434,312 B2 * | 5/2013 | Eroglu | F02C 6/003 60/39.13 |
| 8,794,008 B2 * | 8/2014 | Eroglu | F02C 6/003 60/39.13 |
| 2002/0157400 A1 * | 10/2002 | Schulten | F23R 3/46 60/772 |
| 2003/0221409 A1 * | 12/2003 | McGowan | F02C 3/30 60/39.17 |
| 2004/0031270 A1 * | 2/2004 | Sileo | F01D 9/023 60/796 |
| 2006/0185345 A1 * | 8/2006 | Wilson | F01D 9/023 60/39.37 |
| 2007/0033945 A1 * | 2/2007 | Goldmeer | F02C 3/20 60/774 |
| 2009/0084082 A1 * | 4/2009 | Martin | F01D 9/023 60/39.281 |
| 2010/0018210 A1 * | 1/2010 | Fox | F23R 3/16 60/746 |
| 2010/0031665 A1 * | 2/2010 | Chokshi | F01D 5/186 60/760 |
| 2010/0077760 A1 * | 4/2010 | Laster | F23C 7/004 60/742 |
| 2010/0300109 A1 * | 12/2010 | Carroni | F23R 3/286 60/776 |
| 2011/0016871 A1 * | 1/2011 | Kraemer | F23N 5/082 60/772 |
| 2011/0094241 A1 * | 4/2011 | Rodd | F01D 19/00 60/778 |
| 2011/0314825 A1 * | 12/2011 | Stryapunin | F02C 7/22 60/737 |
| 2012/0017601 A1 | 1/2012 | Eroglu et al. | |
| 2014/0144156 A1 * | 5/2014 | Lang | G01K 11/24 60/793 |

FOREIGN PATENT DOCUMENTS

| | | | |
|---|---|---|---|
| EP | 0 321 809 | 6/1989 | |
| EP | 0 620 362 | 10/1994 | |
| EP | 0 646 704 | 4/1995 | |
| EP | 0 646 705 | 4/1995 | |
| EP | 0 704 657 | 4/1996 | |
| EP | 0 718 470 | 6/1996 | |
| EP | 2 206 959 | 7/2010 | |
| RU | 2106573 C1 | 3/1998 | |
| RU | 2447304 C2 | 4/2012 | |
| WO | 03/038253 | 5/2003 | |
| WO | WO 2010/112318 A1 * | 10/2010 | F02C 6/00 |

OTHER PUBLICATIONS https://en.wikipedia.org/w/index.php?title=Combustor&oldid=349302710[Jul. 13, 2017 10:41:00 AM]; Title: Combustor; pp. 6-7.*
Office Action dated Jul. 20, 2015 in corresponding Mexican Patent Application No. MX 2013010930, and an English translation thereof.

* cited by examiner

GAS TURBINE ASSEMBLY AND CORRESPONDING OPERATING METHOD

CROSS REFERENCE TO RELATED APPLICATIONS

This application claims priority to PCT/EP2012/056323 filed Apr. 5, 2012, which in turn claims priority to Swiss application 00636/11 filed Apr. 8, 2011, both of which are hereby incorporated in their entireties.

TECHNICAL FIELD

The present invention relates to a gas turbine assembly and a method of operating a gas turbine assembly.

BACKGROUND

EP 0 620 362 B1 discloses a gas turbine assembly of the type initially mentioned, this publication forming an integral part of the present description. This comprises at least one compressor, a first combustion chamber arranged downstream of the compressor, a first turbine arranged downstream of the first combustion chamber, a second combustion chamber arranged downstream of the first turbine and a second turbine arranged downstream of the second combustion chamber. Thus, by means of the known gas turbine assembly, a gas turbine process can be implemented which operates with sequential combustion via two combustion chambers and with two turbines. The emission values can be extremely improved with the aid of sequential combustion.

A further gas turbine assembly became known from DE 103 12 971 A1, forming an integral part of the present description, and is based on the general idea of carrying out two-stage combustion in a gas turbine assembly, without a turbine, that is to say a high-pressure turbine, being interposed. Here, this gas turbine assembly puts into practice the recognition that, in a lean-burn combustion chamber, so much oxidizer usually remains in the combustion exhaust gases that, for a subsequent additional combustion stage, only a fuel still has to be supplied per se, in which case there is then only ever a lean fuel/oxidizer mixture. In the absence of a turbine between the two combustion stages or combustion chambers, as is also the case in EP 0 620 362 B1, however, relatively high exhaust gas temperatures occur downstream of the first combustion chamber and, when fuel is admixed, would lead to an immediate ignition, that is to say in the case of insufficient intermixing, to an unstructured combustion reaction during which adverse high emission values arise.

In order to avoid this problem, the publication DE 103 12 971 A1 mentioned proposes to cool the hot combustion exhaust gases of the first combustion chamber before the further fuel is introduced into the combustion exhaust gases, in order thereby to form the fuel/oxidizer mixture for the second combustion chamber. By the combustion exhaust gases of the first combustion chamber or of the first combustion stage being cooled, the exhaust gas temperature can be lowered to an extent such that the ignition of the fuel introduced is delayed until sufficient mixture formation can take place in order to form the desired lean fuel/oxidizer mixture between the combustion exhaust gases of the first combustion chamber and the fuel additionally supplied.

It is especially important in this case that the fuel taking effect in the second combustion stage can be introduced into the cooled exhaust of the first combustion stage directly, that is to say without a premix being formed. In this respect, for the supply of fuel in the second combustion stage, in particular, the proven technology, as gathered from EP 0 620 362 B1, will be adopted.

By means of the two-stage lean/lean combustion, without an interposed turbine, as may be gathered from DE 103 12 971 A1, it is possible at nominal operating point of the gas turbine assembly to achieve especially favorable emission values. Furthermore, considerable advantages for transient operating states are afforded. For example, in part-load operation, the second combustion chamber can be deactivated, while the first combustion chamber operates, as before, in its nominal operating state. The first combustion stage can thereby operate optimally with regard to emission values and efficiency, as a result of which, in these transient operating states, the gas turbine assembly possesses, overall, favorable values for emission and efficiency. Moreover, it is possible, particularly when the gas turbine assembly is being run up or for peak loads, to use the second combustion stage as a "booster", in that correspondingly increased fuel quantities are supplied to the second combustion stage.

In this case, the combustion gases of the first combustion chamber can be cooled by means of heat transmission. Heat is thus extracted from the combustion gases and transmitted to another medium, so that it is possible to use elsewhere the heat which has been extracted from the gas turbine process. For example, the extracted heat may be used for generating steam for a steam turbine.

Alternatively, the cooling of the combustion gases of the first combustion chamber may also be achieved in that a suitable cooling medium is introduced into the combustion gases. In this procedure, the decrease in temperature of the combustion gases occurs because of intermixing with the cooler cooling medium. During such cooling, however, the mass flow is increased because of the cooling, and this may at the same time entail an increase in output of the gas turbine assembly. Cooling by a controlled introduction or injection of the cooling medium may also be utilized correspondingly as a "booster", in order, particularly for a short time, to regulate the output of the gas turbine and assembly.

It is nevertheless still desirable, in a gas turbine assembly of the type initially mentioned, to improve the emission values and combustion chamber design even further. In combustion chamber design, it is important, in particular, to influence positively the relatively long axial length of the two sequentially arranged combustion chambers which consequently govern the distance between bearings. In particular, those combustion-related bottlenecks and interferences which are found in the case of continuous ring-shaped combustion chambers and which occur in gas turbine assemblies with high outputs are to be avoided. In summary, it can be said that it is also a primary gain in the design of such sequential combustion systems to have improved compactness of the entire gas turbine assembly.

Moreover, the following publications likewise form an integral part of the present description:

EP 0 321 809 A and B
EP 0 704 657 A and B
EP 0 646 705 A and B
EP 0 646 704 A and B
EP 0 718 470 A and B Relevant publications which contain one or more developments of one of the publications mentioned likewise form an integral part of the present description.

SUMMARY

This is where the invention comes in. The object on which the invention, as characterized in the claims, is based is, in a gas turbine assembly of the type initially mentioned or for a corresponding operating method for operating such a gas turbine assembly, to propose a more compact design of the gas turbine assembly which ensures an improvement in the combustion potential, particularly in the operation of those gas turbine assemblies with higher outputs, and in which the emission values can consequently be minimized.

For this purpose, the gas turbine assembly according to the invention is composed essentially of a compressor, of a combustion chamber designed with two sequentially arranged burners or burner groups which allow sequential combustion, and of a turbine following the combustion chamber.

The first and the second burner or the first and the second burner group are, in the direction of flow of their combustion path, in each case an integral part of a tubular duct which extends between the compressor and turbine, is designed for compactness and is closed off or virtually closed off on itself and which performs the function of a combustion chamber element. If a plurality of combustion chamber elements are provided, these are arranged in the form of a ring around the rotor of the gas turbine assembly.

These ducts have a diverse throughflow cross section, for example round, oval, elliptic, polygonal, etc., in this case the respective cross-sectional shape may possibly not have a continuously uniform configuration, that is to say the cross-sectional shape in the region of the second burner or of the second burner group may have a divergent form from a specific cross-sectional shape in the region of the first burner or of the first burner group.

In the direction of flow of the combustion path, the individual ducts may have intermediary portions which form a common ring-shaped zone. Such intermediate ring-shaped portions may relate both to the combustion region of the first and/or second burner and to the flow path between said burners.

In summary, the combustion chamber elements can have the following configurations, the versions illustrated here not constituting a fully self-contained list, nor is the above-mentioned tubularity necessarily to be understood in the sense of a coherent monotonic one of the pipeline between the compressor and turbine. The different cross sections of these burner elements have already been dealt with further above.

According to the invention, the gas turbine assembly has between the first and the second burner or the first and second burner group a transition duct which forms a straightforward continuation of the upstream duct or an intermediate ring-shaped transition duct, into which the individual ducts are then introduced.

The last-mentioned design of the transition duct, in particular, makes it advantageously possible that part of the compressor air and/or a steam quantity and/or another gas can be introduced into said transition duct. Furthermore, such a coherent ring-shaped transition duct may advantageously be designed as a mixer. Moreover, such a transition duct may also be designed advantageously as a heat exchanger.

In this case, said burners or burner groups may be designed as premix burners, although such a design does not necessarily have to be inferred, for example diffusion burners or hybrid burners may readily be provided. It is also readily possible to combine burners of different types with one another in burner groups.

If premix burners are provided, these are preferably to be designed according to the subjects and combustion methods in the publications EP 0 321 809 A1 and/or EP 0 704 657 A1, these publications forming an integral part of this description.

Said premix burners, in particular, can be operated with liquid and/or gaseous fuels of all types. It is thus readily possible to provide different fuels within the individual burner groups or burners. That is to say, a premix burner can also be operated simultaneously with different fuels.

As regards the second burner, this is preferably constructed according to EP 0 620 362 A1 or DE 103 12 971 A1, these publications also forming an integral part of this description.

However, such a structure is not mandatory, for there may also be provision, on good grounds, for the combustion flame to act in the burner duct.

In the context of the above statements, according to which ring-shaped intermediate portions may occur within the flow path, a transfer duct will, if required, lead to the turbine on the downstream side of the second burner or of a second burner group, the individual ducts converging into said transfer ducts, thus ensuring that an integral flow acts upon the turbine.

In this gas turbine assembly, there is provision, as a design variant, whereby the rotating parts of the compressor and turbine are arranged on a common rotor. A multishaft gas turbine assembly, such as has already become known from the prior art, can also be the basis of the subject of the invention. Finally, such a gas turbine assembly can also be provided as an integral part of a gas/steam combined-cycle power plant, that is to say the exhaust gases from the gas turbine assembly then serve for the production of steam to operate a steam turbine which in turn is coupled to a further generator. Conversely, the steam circuit can then also deliver that steam quantity which serves for cooling the thermally loaded component of the gas turbine assembly.

According to the invention, what is also in question here is a method for operating such a gas turbine assembly which has essentially the same set-up as described above, that is to say to the effect that the first and the second burner or the first and the second burner group are operated sequentially in the direction of flow of their combustion gas path within a tubular combustion chamber element extending between the compressor and turbine and designed as a duct. The heat potential of the exhaust gases from such a combustion chamber can be recuperated for operating a steam circuit.

What is essential in this gas turbine assembly, however, is its set-up which is preferably composed of a number of tubular combustion chamber elements which are arranged around the rotor and, during operation, maintain with respect to one another either an autonomous or quasi-autonomous sequential combustion. This sequential combustion with regard to the first and the second burner or to the first and the second burner group is possible even when the flow path of the individual ducts does not have continuous autonomy between the compressor and turbine, but instead intermediate portions are present which have a uniform ring-shaped design, as is the case, for example, with regard to the transfer duct to the turbine.

First, further action is taken upon the combustion gases in the intermediate transition duct, closed off on itself or of ring-shaped design, downstream of the first burner and upstream of the second burner. A first possibility here is that these combustion gases from the first burner can be cooled by means of a heat exchanger. This is because combustion in the first burner can be operated at a relatively high exhaust gas temperature, so that admixing a fuel will lead to an immediate reaction, that is to say, with insufficient intermixing, there is then the risk that there is a spontaneous and therefore uncontrolled combustion process in which high emission values would have to be expected. An inert fluid, in particular water, water vapor, fresh air, bypass air or cooling air, is used as coolant for operating such a heat exchanger.

The two sequentially arranged burners or burner groups of each tubular combustion chamber element are operated individually with a fuel, the fuel for the second combustion chamber being introduced directly via a fuel nozzle operating there. If the gas temperatures here are between 900° and 1100° C., autoignition of the injected fuel takes place.

In order to ensure optimal coordination of the temperatures prevailing in the tubular combustion chamber element, it is possible to use for the first and/or the second burner or the first and the second burner group lean mixtures which lead to regulated combustion, thus avoiding the risk of NOx formation. There can also be provision for injecting a further fuel in the intermediate transition duct between the first and the second burner, thus leading to proactive premixing upstream of the second burner. Such a fuel may a lean mixture, although the introduction or admixing of a highly reactive gas is also possible.

Advantageous embodiments of the invention which relate to its object at the subject matter of the dependent claims.

BRIEF DESCRIPTION OF THE DRAWING

Preferred exemplary embodiments of the invention are illustrated in more detail and described in the following figure or figures. All elements not essential for the direct understanding of the invention have been omitted. Identical elements are given the same reference symbols in the various figures. In these.

DETAILED DESCRIPTION

Figure 1:
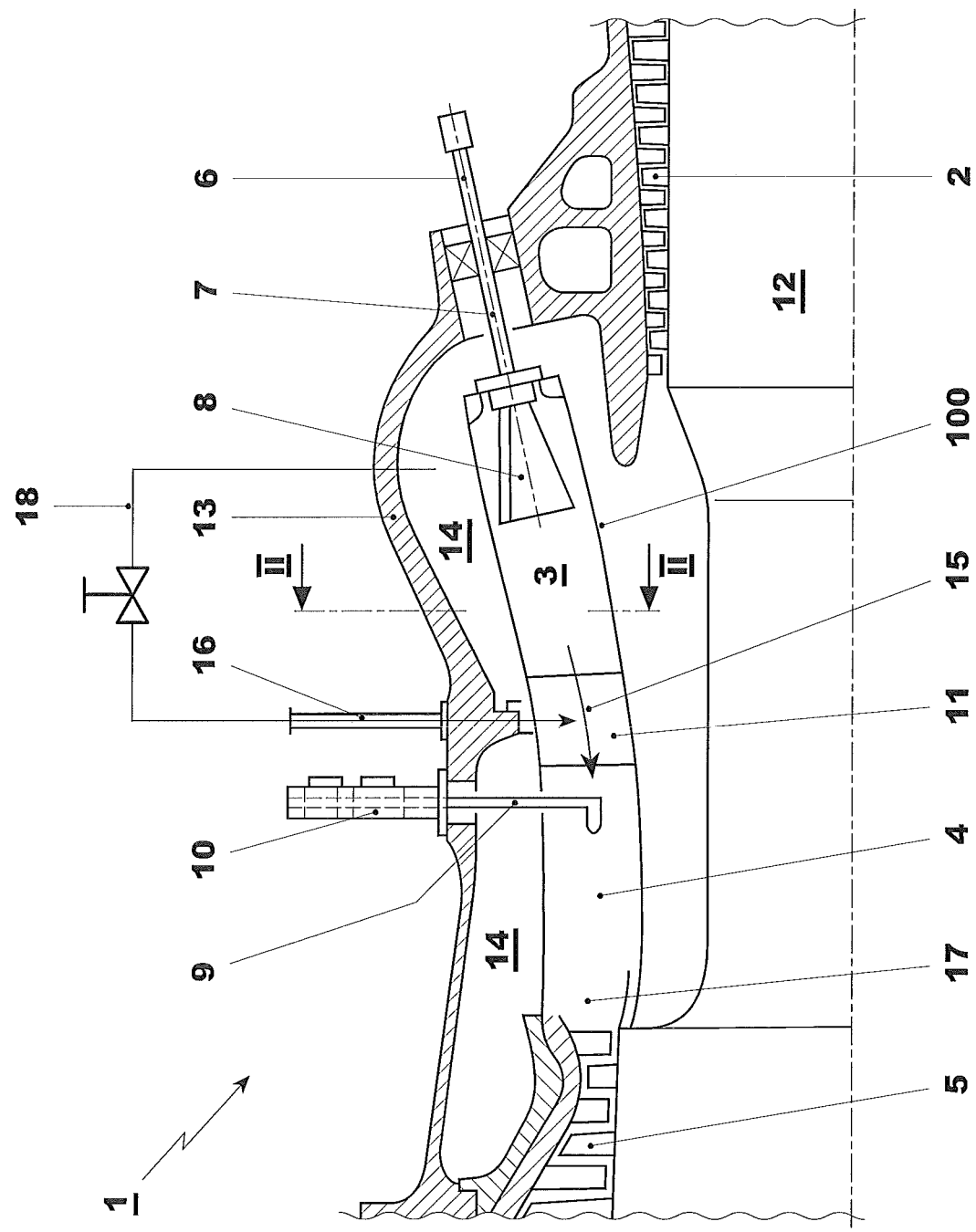
FIG. 1 shows a highly simplified longitudinal section through a gas turbine assembly according to the invention in which the transition duct has injection.

FIG. 1 shows a gas turbine assembly 1 composed of a compressor 2, of a first burner 8, of a second burner 9 and of at least one turbine 5 which acts downstream of the reaction zone 4 belonging to the second burner 9. The first burner 8 is arranged downstream of the compressor 2 and is acted upon by the air compressed there. The second burner 9 is arranged downstream of the reaction zone 3 belonging to the first burner 8. The first burner 8 has a first fuel supply device 6 which supplies a gaseous and/or liquid fuel to said first burner 8 via a fuel lance 7. The second burner 9 has an autonomous second fuel supply device 10 which likewise ensures the supply of a gaseous and/or liquid fuel. Directly downstream of first burner 8, the associated reaction zone 3 takes effect, and downstream of the latter is arranged a transition duct 11 which, depending on its configuration, may be designed for various purposes. This is dealt with in more detail further below. The first burner 8 and the second burner 9, the associated reaction zones 3, 4 and the transition duct 11 connected between them form a combustion chamber element 100, closed off on itself, which is operated autonomously, as the individual fuel supplies 6 and 10 show. Here, therefore, sequential combustion does not take place via common uniform annular combustion chambers, as is also described, for example, in WO 03/038253, but instead via a number of combustion chamber elements 100 which are arranged individually around the rotor 12 of the gas turbine assembly 1 (see, in this respect, FIG. 2).

The number of combustion chamber elements 100 arranged in this way depends on the size of the gas turbine assembly 1 and on the power output to be achieved. The combustion chamber elements 100 are accommodated in a housing 13 of a gas turbine assembly 1, at the same time being surrounded by an envelope of air 14, via which the compressed air flows to the first burner 8.

The transition duct 11 contains a combustion gas path 15 which is symbolized here by an arrow and through which the combustion gases of the first burner 8 flow when the gas turbine assembly 1 is in operation.

This combustion path 15 connected operatively to the transition duct 11 can be configured individually in terms of its function.

In FIG. 1, the transition duct 11 is connected operatively to an injection device 16 which is connected to the compressed air 14 via a regulated line 18 and via which cooling air can be introduced or injected into the combustion gas path 15 symbolized by an arrow. The injection device 16 may also be operated with an externally fed cooling medium. An externally supplied cooling medium may expediently be a fluid inert to the combustion reaction, such as, for example, water or water vapor. It is likewise possible to use fresh air, bypass air or cooling air as an external cooling medium.

In a further embodiment of the transition duct 11, the latter may be designed as a heat exchanger. Such a heat exchanger likewise has the already described combustion gas path 15, through which the combustion gases of the first burner 8 again flow. This combustion gas path 15 configured in this way provides a cooling medium path which extracts a heat quantity from the highly heated combustion gases of the first burner 8. With such an embodiment of the transition duct 11, it can therefore be said that the combustion chamber elements 100 are coupled directly to heat transmission. When the gas turbine assembly 1 is in operation, a cooling medium, for example water or water vapor, flows through the cooling medium path in order to feed the transition duct 11 designed as a heat exchanger. In such a heat exchanger, heat is extracted from the combustion gases and is transmitted to the cooling medium used there, with the result that the combustion gases from the operation of the first burner 8 are cooled and the cooling medium is virtually heated. The heated cooling medium can then be utilized downstream of the heat exchanger for other processes. For example, the cooling medium, insofar as it is water vapor, can be supplied to a steam turbine.

The transition duct 11 may also be designed for another type of operation, in that the injection device 16 is configured as an internal injection device which supplies the respective cooling medium to the combustion gas path 15 internally, that is to say from inside. The internally supplied cooling medium is expediently cooling air which can be extracted at suitable locations from a cooling air system of the gas turbine assembly 1. For example, this can easily be implemented after the combustion chamber elements 100 are surround in the housing 13 by an envelope of air 14 composed of compressed air.

If the length of the uniform rotor 12 is to be minimized, a configuration can be provided in which the combustion chamber elements 100 no longer run essentially horizontally, but are angled in the vertical direction approximately from the middle, in such a way that the individual fuel lances 7 then pierce the housing on the topside essentially obliquely to vertically or quasi-vertically. The length of the rotor 13 can consequently be reduced substantially by means of such a measure.

Irrespective of the routing of the burner elements 100, the gas turbine assembly 1 according to the invention is expediently operated as follows:

The compressor 2 generates compressed air which is supplied to the first burner 8. A substream of the compressed air may in this case serve as cooling gas or cooling air and be utilized for cooling various components of the gas turbine assembly 1. The first fuel supply device 6 injects the fuels directly into the individual burner of each combustion chamber element 100, said burner being acted upon by compressed air and being designed as a premix burner 8. Fuel injection and the respective premix burner 8 are in this case coordinated with one another such as to establish a lean fuel/oxidizer mixture which burns within the first reaction zone 3 with favorable values for pollutant emission and efficiency. The combustion gases in this case occurring are supplied to the second burner 9 via the transition duct 11 already described.

If this transition duct 11 is designed as a heat exchanger, the combustion gases from the first reaction zone 3 are cooled to an extent such that fuel injection into the combustion gases, which takes place via the second fuel supply device 10, does not lead to undesirable premature autoignition outside the second reaction zone 4. For example, the combustion gases are cooled to about 1100° C. or below with the aid of such a heat exchanger.

Fuel is then supplied once again in a burner 9 with the aid of the second fuel supply device 10 to the combustion gases cooled in this way, here, too, the burners and fuel supply being configured so as to form from them a lean fuel/oxidizer mixture which burns in the second reaction zone 4 with favorable values in terms of pollutant emission and of efficiency.

The combustion gases formed in the second reaction zone 4 then act upon the following turbine 5. In this context, there can be provision whereby all the autonomously operated combustion chamber elements 100 form a common ring-shaped transfer duct 17, so that the turbine 5 acting directly downstream can be acted upon uniformly.

The result of cooling the combustion and exhaust gases within the first reaction zone 3 before the second fuel supply device 9 injects the fuel is that sufficient mixture formation can occur in the region of the burner 9 before the autoignition of the fuel injected by means of the second fuel supply device 10. This measure ensures that the desired lean combustion can take place.

As a result of the cooling of the combustion exhaust gases of the first reaction zone 3, it is thus possible with the aid of the second fuel supply device 10 to inject the fuel directly into the then cooled combustion gases. This is especially advantageous because conventional technologies proven in practice for direction fuel injection can therefore be adopted. (For example, a relevant specific publication could be referred to here and then form an integral part of the present description.)

Essential advantages of the lean/lean combustion thus implemented are, on the one hand, improved values with regard to the pollutant emission and efficiency of the gas turbine assembly 1. On the other hand, advantages arise when the gas turbine assembly 1 is operated outside its nominal operating state. For example, the gas turbine assembly 1, that is to say the individual combustion chamber elements 100, can also be operated with only one burner 8, 9, expediently with the first burner 8, for example in order to allow part-load operation. In such part-load operation of the gas turbine assembly 1, the first burner 8 can be operated at its nominal operating point, with the result that favorable values for pollutant emission and efficiency can be achieved even in a part-load situation. Furthermore, possibilities are afforded for briefly increasing the power output of the gas turbine assembly 1 during start-up and/or at peak load times, for example in that an increased fuel quantity is supplied to the second burner 9.

Particularly because the gas turbine assembly taken as a basis here is run with a number of autonomously operated combustion chamber elements 100, there can also be provision, for part-load operation, whereby there is not necessarily a reduction in operation to the first burner 8, but the number of combustion chamber elements 100 which are fully in operation can be reduced. Flexibility, the gain in efficiency and minimization of pollutant emissions in the gas turbine assembly 1 according to the invention can thus be maximized in any operating state.

It is notable, moreover, that, in sequential combustion, basically no additional fresh gas (air quantity) has to be supplied in order to provide a lean fuel/oxidizer mixture both for the first burner 8 and for the second burner 9. For this purpose, the fuel/air ratio selected for the fuel/oxidizer mixture supplied to the first burner 8 is so lean that a fuel quantity required for the combustion reaction in the second reaction zone 4 can still be supplied to the lean combustion gases occurring in the first burner 8 and the fuel/oxidizer mixture thus formed for the second reaction zone 4 is still sufficiently lean to implement the desired low-pollutant and efficient combustion.

While, in the cooling of the combustion gases with the aid of the heat exchanger described above, the mass flow from the first reaction zone 3 to the second reaction zone 4 remains essentially constant, the mass flow available to the second reaction zone 4 can be increased with the aid of the injection device 16 according to FIG. 1.

An increase in power of the following turbine 5 can thus be achieved at the same time. The cooling devices in the transition duct 11 which operate with the injection device 16 are useful particularly when the injection of the cooling medium is to be utilized for briefly increasing the power of the gas turbine assembly 1, for example in order to bridge peak load times and/or to accelerate the start-up of the gas turbine assembly 1.

As already presented in detail above under "Presentation of the invention", the sequential combustion presented with regard to the first and the second burner 8, 9 is possible even when the flow path of the individual burner elements 100 does not have continuous autonomy between the compressor 2 and turbine 5, but has intermediate portions which are of ring-shaped uniform form, as is the case, for example, with regard to the transfer duct to the turbine. Such a portion may refer directly to the transition duct 11. Basically, the situation is also not ruled out where one of the reaction zones 3, 4 is of uniform ring-shaped design. It could therefore also be possible that the parts of each burner element 100 which are autonomous in terms of flow refer only to the regions in the surroundings of the burners 8, 9.

Figure 2:
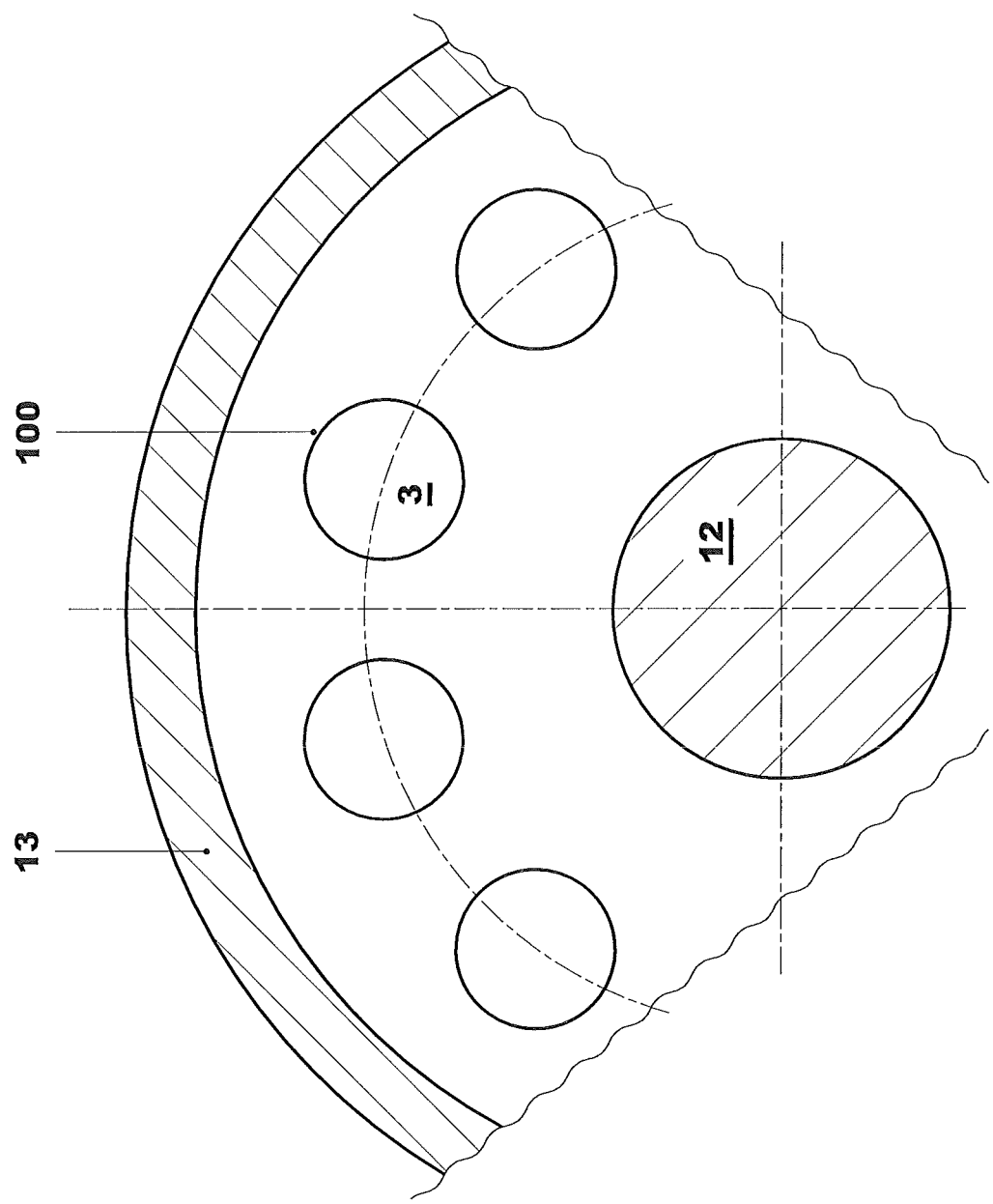
FIG. 2 shows a section through the gas turbine assembly.

FIG. 2 constitutes the section II-II from FIG. 1. What is clear here is the configuration of the burner elements 100 arranged in the form of a ring around the rotor 12.

Figure 3:
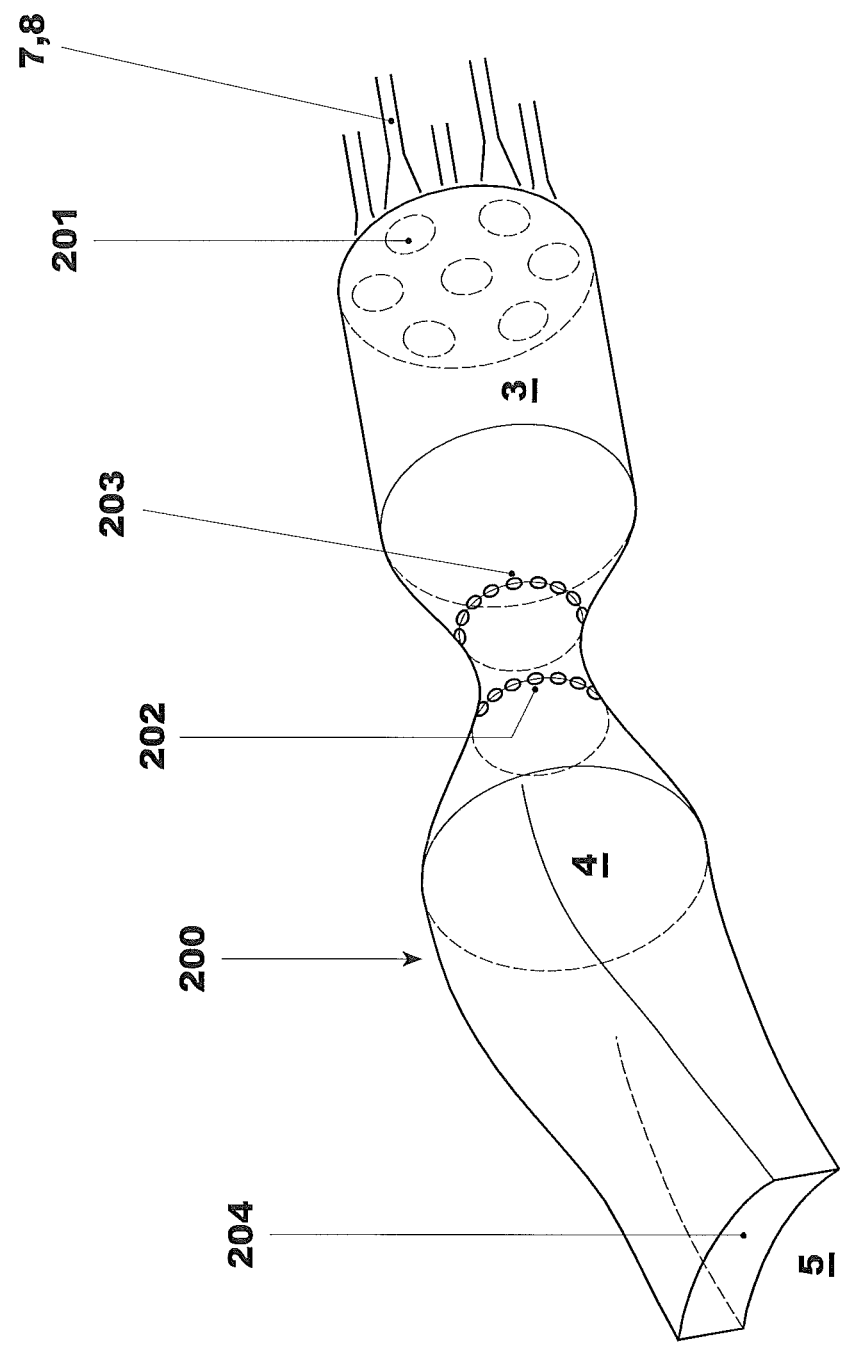
FIG. 3 shows a further configuration of a coherent burner element.
Figure 4:
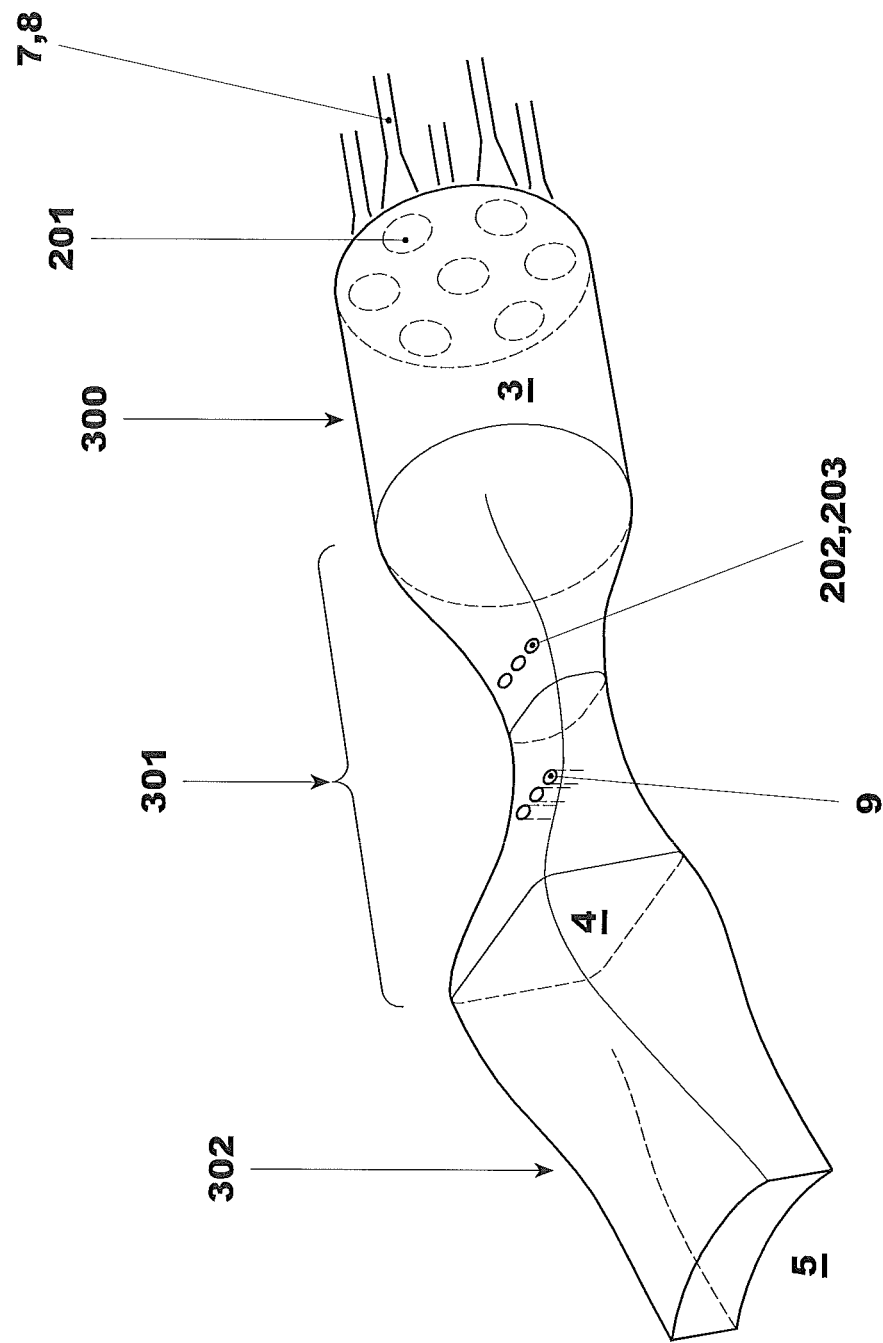
FIG. 4 shows a further configuration of a coherent burner element.

FIG. 3 shows a burner element 200 with a multivariable cross-sectional profile in the direction of flow. On the head side, the first portion of the burner element 200 is no longer equipped with a single burner, but with a burner group 201 which itself may be constructed from uniform or different burners. Here, too, premix burners, diffusion burners, hybrid burners, etc., may be used, and in this case a combination of said burners may also be employed. A first reaction zone 3 follows downstream of this first burner group and corresponds approximately to that from FIG. 1. On the downstream side of this reaction zone 3, the original cross section merges into a contraction. This contraction forms a new highly narrowed cross section 203 in which an SEV burner 202 is used. This SEV burner 202 has a function of a second burner and fulfills the further task of completing the heat treatment of the hot gases. Here, too, of course, not only individual burners can be provided, but entire burner groups may also operate here. For the mode of operation of an SEV burner 202, reference is made to the publication mentioned which forms an integral part of this description. There then follows a second reaction zone 4 which, at least initially, has approximately the round cross section of the first reaction zone 3. However, the subsequent run then merges into an approximately rectangular cross-sectional profile 204 which constitutes optimal flow conditions for the following turbine 5 to be acted upon.

The invention claimed is:
1. A gas turbine assembly, comprising:
at least one compressor;
a plurality of combustion chamber elements accommodated in a housing of the gas turbine assembly, each of the plurality of combustion chamber elements having a first burner group, the first burner group comprising a plurality of first burners, and a transition duct having at least one second burner, the at least one second burner being a Sequential EnVironmental (SEV) burner arranged on a contraction of the transition duct, the transition duct and the at least one second burner being downstream of the first burner group without an interposed turbine arranged between the first burner group and the at least one second burner, and wherein the transition duct is configured to deliver a combustion gas from the first reaction zone to the at least one second burner at 900° C. to 1100° C. for autoignition of a fuel from the at least one second burner;
at least one turbine downstream of the plurality of combustion chamber elements;
at least one rotor;
wherein the plurality of combustion chamber elements are arranged in a form of a ring around the at least one rotor of the gas turbine assembly, each of the plurality of combustion chamber elements extending between the at least one compressor and the at least one turbine, each of the plurality of combustion chamber elements having a tubular or shape-changing cross section and extending at a radial distance from the at least one rotor of the gas turbine assembly, and includes the transition duct arranged downstream of a first reaction zone belonging to the first burner group, the first reaction zone having a round cross sectional shape;
wherein the first burner group, the at least one second burner, the first reaction zone, a second reaction zone belonging to the at least one second burner, and the transition duct are each located within each of the plurality of combustion chamber elements;
wherein the plurality of combustion chamber elements are configured during operation to maintain with respect to one another either an autonomous or quasi-autonomous sequential combustion;
wherein each of the transition ducts has a cross sectional shape, which is round, oval, or elliptical, and wherein the cross sectional shape of the transition duct contracts from the cross sectional shape of the first reaction zone and expands to a rectangular cross sectional shape; and
wherein each of the second reaction zones has the rectangular cross sectional shape.

2. The gas turbine assembly as claimed in claim 1, wherein the transition duct is designed as a heat exchanger.

3. The gas turbine assembly as claimed in claim 1, wherein each of the plurality of first burners is a premix burner.

4. The gas turbine assembly as claimed in claim 3, wherein the premix burner is operated at least with an $H_2$-rich fuel.

5. The gas turbine assembly as claimed in claim 1 wherein rotating parts of the at least one compressor and the at least one turbine are arranged on a common rotor.

6. The gas turbine assembly as claimed in claim 1 wherein the gas turbine assembly is an integral part of a gas/steam combined-cycle power plant.

7. The gas turbine assembly as claimed in claim 1, wherein the plurality of first burners are one or more of the following:
premix burners, diffusion burners, and hybrid burners.

8. The gas turbine assembly as claimed in claim 1, wherein each of the plurality of combustion chamber are individually arranged around the at least one rotor, and wherein the at least one rotor is a common rotor.

9. The gas turbine assembly as claimed in claim 1, wherein the at one second burner comprises a plurality of second burners.

10. The gas turbine assembly as claimed in claim 1, wherein a part of a compressor air and/or a steam quantity and/or another gas is introduced at the transition duct into the combustion gases originating from the first burner group.

11. A method for operating a gas turbine assembly comprising at least one compressor, a plurality of combustion chamber elements accommodated in a housing of the gas turbine assembly, each of the plurality of combustion chamber elements having a first burner group, the first burner group comprising a plurality of first burners, and a transition duct having at least one second burner, the at least one second burner being a Sequential EnVironmental (SEV) burner arranged on a contraction of the transition duct, the transition duct and the at least one second burner being downstream of the first burner group without an interposed turbine arranged between the first burner group and the at least one second burner, at least one turbine downstream of the plurality of combustion chamber elements, at least one rotor, and wherein the plurality of combustion chamber elements are arranged in a form of a ring around the at least one rotor of the gas turbine assembly, each of the combustion chamber elements extending between the at least one compressor and the at least one turbine, each of the plurality of combustion chamber elements having a tubular cross section and extending at a radial distance from the at least one rotor of the gas turbine assembly, and includes the transition duct arranged downstream of a first reaction zone belonging to the first burner group, the first reaction zone having a round cross sectional shape, and wherein the first burner group, the at least one second burner, the first reaction zone, a second reaction zone belonging to the at least one second burner, and the transition duct are located within each of the plurality of combustion chamber elements, wherein the plurality of combustion chamber elements are arranged around the at least one rotor, and are configured during operation to maintain with respect to one another either an autonomous or quasi-autonomous sequential combustion, wherein each of the transition ducts has a cross sectional shape, which is round, oval, or elliptical, and wherein the cross sectional shape of the transition duct contracts from the cross sectional shape of the first reaction zone and expands to a rectangular cross sectional shape, and wherein each of the second reaction zones has the rectangular cross sectional shape, the method comprising:
sequentially operating the first burner group and the at least one second burner in a direction of a flow of a combustion path within a tubular each of the plurality of combustion chamber element elements extending between the at least one compressor and the at least one turbine;
arranging the transition duct downstream of a first reaction zone belonging to the first burner group;
introducing part of a compressor air and/or a steam quantity and/or another gas into combustion gases originating from the first burner group at the transition duct of each of the plurality of combustion chamber elements;
cooling the combustions gases from the first burner group in the transition duct to 900° C. to 1100° C.; and
autoigniting an injected fuel from the at least one second burner with the combustion gases from the first burner group.

12. The method as claimed in claim 11, comprising:
using a calorific potential of exhaust gases from the gas turbine assembly for operating a steam circuit.

13. The method as claimed in claim 11, comprising:
cooling the combustion gases from first combustion in an intermediate transition duct downstream of the first reaction zone belonging to the first burner group and upstream of the at least one second burner.

14. The method as claimed in claim 13, comprising:
cooling the combustion gases from first combustion with a heat exchanger in the intermediate transition duct downstream of the first reaction zone belonging to the first burner group and upstream of the at least one second burner.

15. The method as claimed in claim 13, comprising:
using water vapor, fresh air, bypass air or cooling air, for cooling the combustion gases.

16. The method as claimed in claim 11, comprising:
supplying a first fuel to the first burner group;
supplying a second fuel to the at least one second burner; and
injecting the second fuel directly into combustion gases from a first combustion.

17. The method as claimed in claim 11, comprising:
forming the fuel for the first burner group and/or the at least one second burner by a lean mixture.

18. The method as claimed in claim 13, comprising:
injecting a further fuel into the intermediate transition duct.

19. The method as claimed in claim 18, comprising:
using a lean mixture and/or a highly reactive gas as the further fuel.

20. The method as claimed in claim 11, wherein the plurality of first burners are one or more of the following:
premix burners, diffusion burners, and hybrid burners.

21. The method as claimed in claim 11, comprising:
surrounding each of the plurality of combustion chamber elements by an envelope of air, via which a compressed air flows to the first burner group.

22. The method as claimed in claim 11, wherein the at one second burner comprises a plurality of second burners.

23. A gas turbine assembly, comprising:
at least one compressor;
a plurality of combustion chamber elements accommodated in a housing of the gas turbine assembly, each of the plurality of combustion chamber elements having a first burner group, the first burner group comprising a plurality of first burners, and a transition duct having at least one second burner, the at least one second burner being a Sequential EnVironmental (SEV) burner arranged on a contraction of the transition duct, the transition duct and the at least one second burner being downstream of the first burner group without an interposed turbine arranged between the first burner group and the at least one second burner, and wherein the transition duct is configured to deliver a combustion gas from the first reaction zone to the at least one second burner at 900° C. to 1100° C. for autoignition of a fuel from the at least one second burner;
at least one turbine downstream of the plurality of combustion chamber elements;
at least one rotor;
wherein the plurality of combustion chamber elements are arranged in a form of a ring around the at least one rotor of the gas turbine assembly, each of the plurality of combustion chamber elements extending between the at least one compressor and the at least one turbine, each of the plurality of combustion chamber elements having a tubular or shape-changing cross section and extending at a radial distance from the at least one rotor of the gas turbine assembly, and includes the transition duct arranged downstream of a first reaction zone belonging to the first burner group, the first reaction zone having a round cross sectional shape;
wherein the first burner group, the at least one second burner, the first reaction zone, a second reaction zone belonging to the at least one second burner, and the transition duct are each located within each of the plurality of combustion chamber elements;
wherein the plurality of combustion chamber elements are configured during operation to maintain with respect to one another either an autonomous or quasi-autonomous sequential combustion; and
wherein each of the transition ducts has a round cross sectional shape, and wherein the round cross sectional shape of the transition duct contracts from the round cross sectional shape of the first reaction zone and expands to a rectangular cross sectional shape; and
wherein each of the second reaction zones has a first rectangular cross sectional shape having a cross sectional area greater than a cross sectional area of the transition duct and subsequently merges in a second rectangular cross sectional shape.

24. The gas turbine assembly as claimed in claim 23, wherein the plurality of first burners are one or more of the following:
premix burners, diffusion burners, and hybrid burners; and
wherein each of the at least one second burners comprises a plurality of second burners.

25. The gas turbine assembly as claimed in claim 23, wherein a part of a compressor air and/or a steam quantity and/or another gas is introduced at the transition duct into the combustion gases originating from the first burner group.

* * * * *